United States Patent
Wang (10) Patent No.: US 11,646,891 B2
(45) Date of Patent: May 9, 2023

(54) COMPACT RECORDATION PROTOCOL

(71) Applicant: Visa International Service Association, San Francisco, CA (US)

(72) Inventor: Quan Wang, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 248 days.

(21) Appl. No.: 16/476,649

(22) PCT Filed: Mar. 10, 2017

(86) PCT No.: PCT/US2017/021870
§ 371 (c)(1),
(2) Date: Jul. 9, 2019

(87) PCT Pub. No.: WO2018/164695
PCT Pub. Date: Sep. 13, 2018

(65) Prior Publication Data
US 2019/0363892 A1   Nov. 28, 2019

(51) Int. Cl.
*H04L 29/06* (2006.01)
*H04L 9/32* (2006.01)
*H04L 9/00* (2022.01)

(52) U.S. Cl.
CPC .......... *H04L 9/3236* (2013.01); *H04L 9/3297* (2013.01); *H04L 9/50* (2022.05)

(58) Field of Classification Search
CPC .. H04L 9/3236; H04L 9/3297; H04L 2209/38
See application file for complete search history.

(56) References Cited

U.S. PATENT DOCUMENTS

| 7,783,579 B2 * | 8/2010 | Gentry | G06Q 40/12 |
| | | | 705/76 |
| 2010/0110935 A1 * | 5/2010 | Tamassia | H04L 67/1065 |
| | | | 370/256 |
| 2015/0294308 A1 | 10/2015 | Pauker et al. | |

(Continued)

FOREIGN PATENT DOCUMENTS

WO     2017011601 A1    1/2017

OTHER PUBLICATIONS

International Search Report, dated Nov. 16, 2017, in PCT Application No. PCT/US2017/021870, 12 pages.
"Developer Guide—Bitcoin", Available Online at, URL:https://web.archive.org/web/20150511232019/https://bitcoin.org/en/developer-guide, May 11, 2015, 49 pages.
EP17899384.6 , "Extended European Search Report", dated Nov. 14, 2019, 8 pages.

(Continued)

*Primary Examiner* — Taghi T Arani
*Assistant Examiner* — Lin Chang
(74) *Attorney, Agent, or Firm* — Kilpatrick Townsend & Stockton LLP (57) ABSTRACT

A method for efficiently storing and verifying records is disclosed. The method may comprise receiving a first hash of first interaction data and determining an interaction identifier associated with the first hash, then storing the first hash in a database along with the interaction identifier and determining a root hash of a hash tree. In addition, the method may also comprise providing the root hash of the hash tree to a public blockchain. Embodiments of the invention also allow users to easily present records to a third party or inquiring entity. Furthermore, interactions may be processed more quickly than previous blockchain methods that publish to a block during each individual interaction.

18 Claims, 5 Drawing Sheets

(56) References Cited

U.S. PATENT DOCUMENTS

| | | | |
|---|---|---|---|
| 2016/0191243 A1* | 6/2016 | Manning | H04L 61/4511 713/168 |
| 2016/0292672 A1 | 10/2016 | Fay et al. | |
| 2016/0379013 A1 | 12/2016 | Ganesan et al. | |
| 2017/0005804 A1 | 1/2017 | Zinder | |
| 2017/0033932 A1* | 2/2017 | Truu | H04L 63/102 |
| 2017/0091726 A1* | 3/2017 | Morgan | G06Q 20/065 |
| 2017/0177855 A1* | 6/2017 | Costa Faidella | H04L 9/3234 |
| 2017/0310653 A1* | 10/2017 | Zhang | H04L 63/08 |
| 2017/0344987 A1* | 11/2017 | Davis | G06Q 20/065 |
| 2018/0115428 A1* | 4/2018 | Lysenko | H04L 9/0637 |
| 2018/0294977 A1* | 10/2018 | Uhr | G06F 21/33 |
| 2018/0331832 A1* | 11/2018 | Pulsifer | G06Q 20/065 |
| 2019/0020485 A1* | 1/2019 | Uhr | G06F 21/64 |

OTHER PUBLICATIONS

Vaughan et al., "Chainpoint A Scalable Protocol for Anchoring Data in the Blockchain and Generating Blockchain Receipts", Available Online at, URL:https://github.com/chainpoint/whitepaper/blob/master/chainpoint_white_paper.pdf, Aug. 31, 2016, 6 pages.

Application No. EP21170792.2, Extended European Search Report, dated Sep. 3, 2021, 7 pages.

CN201780088189.6, "Office Action", dated Jun. 22, 2022, 18 pages.

Vaughan et al., "A Scalable Protocol For Anchoring Data in the Blockchain and Generating Blockchain Receipts", Chainpoint, Github, Aug. 31, 2016, pp. 1-6.

CN201780088189.6, "Office Action", dated Oct. 26, 2022, 6 pages.

* cited by examiner

COMPACT RECORDATION PROTOCOL

This application is a National Stage of International Application No. PCT/US2017/021870 filed Mar. 10, 2017, which is herein incorporated by reference.

BACKGROUND

In today's technological environment, it is common for governments or some other central authority to keep track of important documents and records regarding individuals. Typically, these central authorities may maintain paper records or may maintain electronic records in a centralized database. The documents and records created by these central authorities are often considered trustworthy, and may be used by others to verify information about an individual. An individual is tasked with keeping safe their records, or must contact the corresponding central authority if they would like for their records to be reproduced or presented to a third-party.

For example, when an individual is born, a birth-certificate is created for the person, certifying that he or she was born at a specific time and place. This birth-certificate may then be used to verify the individual's citizenship and issue the person a government ID and social security number. The government ID and social security number may later be presented to a bank to verify the person's identity and issue the person a bank account. Funds deposited into the bank account and credit extended to the individual may be used by the individual to conduct transactions through the use of debit and credit cards embossed with or storing user credentials. Typically, the user credentials are linked to the individual, and a record of transactions made using the credentials is recorded in a central database as a means for providing an official accounting record. The record may later be referenced to verify the transfer of funds between transacting parties. In addition, if the individual wishes to travel across countries they may present their birth-certificate, government ID, and/or social security card to a government agency to obtain a passport, which may then be used to document and verify an individual's travel activity.

In all of the above examples, records may still be forged or counterfeited by criminals, a problem that requires significant financial and human resources to counteract. Furthermore, records are maintained by a central authority, and the trust-worthiness of those records is based upon the trust-worthiness of the central authority, which has the potential to act in a malicious manner. In addition, it is difficult to keep the records safe, which may lead to identity-theft. Records may also be lost, destroyed, or tampered with. Verification and/or reproduction of records may be cumbersome, as central authorities typically only have a limited number of agency locations to serve a large number of individuals seeking to obtain and/or create records. Meanwhile, current attempts at decentralizing the keeping of records have proved inadequate in terms of the security and efficiency required for practical use.

Embodiments of the invention address these and other problems, individually and collectively.

BRIEF SUMMARY

Embodiments of the disclosure are directed to a system and method for securely and efficiently recording and verifying data.

One embodiment of the invention is directed to a method comprising receiving, by a computer, first interaction data for a first interaction between a user and an interacting entity, or a first hash of the interaction data, and determining an interaction identifier associated with the first interaction data or the first hash of the first interaction data. The method may further comprise storing, by the computer, the first hash of the first interaction data in a database along with the interaction identifier, and determining a root hash of a hash tree, the hash tree including the hash of the first interaction data and hashes of other interaction data for other interactions by other users. In addition, the method may also comprise providing, by the computer, the root hash of the hash tree to a public blockchain.

Another embodiment of the invention is directed to the above method further comprising receiving, by the computer, a request to verify the interaction between the user and the interacting entity from an inquiring device, and providing a verification result or the root hash, the verification result indicating that the interaction between the user and the interacting entity occurred. In addition, the method may comprise determining the first hash from the first interaction data in the request to verify, determining the hash tree using the first hash and the hashes of other interaction data by other users, and determining the root hash. The method may also comprise comparing, by the computer, the root hash to a corresponding root hash on the public blockchain, and providing the verification result based upon the comparison.

Another embodiment of the invention is directed to a server computer configured to perform the above-noted method.

Another embodiment of the invention is directed to an interacting device for interacting with a user device. The interacting device comprising: a processor; a network interface coupled to the processor; and a non-transitory computer-readable medium coupled to the processor. The computer-readable medium comprising code for instructing the processor to implement a method, the method comprising: receiving, from the user device of a user, interaction data; generating a hash of the interaction data; sending, to a server computer, a request to generate a record, the request comprising the interaction data or hash of the interaction data; and receiving, from the server computer, a response confirming the recordation of the interaction data or hash of the interaction data, wherein the interaction data or hash of the interaction data is stored, by the server computer, in a database before providing a root hash of a hash tree to a public blockchain, the hash tree including the hash of the interaction data and hashes of other interaction data of other interactions by other users.

These and other embodiments of the invention are described in further detail below.

DETAILED DESCRIPTION

Embodiments of the invention are directed to a system for recording and verifying interactions.

Prior to discussing the details of some embodiments of the present invention, description of some terms may be helpful in understanding the various embodiments.

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers.

An "application server" may be any computing device configured to provide remote support for a user device. The application server may be associated with a set of computer executable instructions to be installed on, and executed from, a user device (e.g., a mobile application). The application server may provide any suitable service and/or processing for the user device. For example, the application server may perform calculations on behalf of the user device. In some embodiments, the application server may maintain an account for one or more users. In some cases, the application server may be capable of generating an electronic identity for an individual, which can be used to authenticate the individual during an interaction. The application server may also store any protocols and/or user preferences related to the operation of the user device.

A "user device" may be any electronic device capable of establishing a communication session with another electronic device (e.g., an application server) and transmitting/receiving data from that device. A user device may include the ability to download and/or execute mobile applications. User devices may include mobile communication devices (e.g., mobile phones), personal computers, laptops, wearable devices, and/or IoT devices such as smart televisions, refrigerators, thermostats, etc. Other examples of user devices may include mobile vehicles that have remote communication capabilities (e.g., cars, motorcycles, boats, etc.).

A "mobile communication device" may be any portable electronic device that has a primary function related to communication. For example, a mobile communication device may be a smart phone, a personal data assistant (PDA), or any other suitable handheld device.

A "blockchain" can be a distributed database that maintains a continuously-growing list of records secured from tampering and revision. A blockchain may include a number of blocks of interaction records. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a verification network. Any node within the verification network may subsequently use the blockchain to verify transactions. The security of a blockchain may be obtained using a cryptographic scheme.

A "block header" may be a header of a data block in a blockchain. The block header may be serialized in 80-byte format and then hashed as part of a blockchain's block writing algorithm. A block header may comprise memory allocations for a block version number and a link to the previous block ensuring that no previous block can be changed with also changing the current block's block header. The block header may also include a Merkle root, which is derived from all hashes of all interactions or transactions included in the block, thus ensuring that none of the recorded interaction data can be modified without modifying the block header. The block may also include a timestamp specifying the time at which a processing computer started writing to the block header.

A "hash tree" may be a data structure comprising a plurality of hashes organized into a hierarchical tree structure. The hashes included in a hash tree may be concatenated and further hashed according to a specified order to yield a root hash that may later be referenced. A hash tree may, for example, be organized according to a binary tree structure. A "Merkle tree" may be a hash tree that is constructed by hashing paired data, then pairing and hashing the results until a single root hash remains, the remaining root hash being a Merkle root.

A "Merkle root" may be the root node or root hash of a Merkle tree, and a descendant of all the hashed pairs in the tree. In a given blockchain, each block header of each block in the blockchain may be required to include a valid Merkle root descended from all transactions or interactions in that block.

A "cryptographic key" may be any string of bits used by a cryptographic algorithm to transform plain text into cipher text or vice versa. Cryptographic keys may include symmetric and asymmetric keys. A cryptographic key may be used to sign transactions and/or verify signed transactions. For example, a cryptocurrency transaction may be signed using a private key. The signed transaction may then be verified using a public key that corresponds to the private key.

An "electronic identity" may be any suitable string of characters or symbols used to identify an entity (e.g., a person or device). In some embodiments, the electronic identity may be mathematically derived from information associated with a user. For example, in some embodiments, an electronic identity may be a value calculated by hashing one or more input values (customer name, country code, etc.) available to multiple entities. In this way, the electronic identity may be independently generated by any entity that has the prerequisite information. An electronic identity may be altered (e.g., hashed and/or encrypted) information associated with a user. For example, in some embodiments, an electronic identity may be derived from a combination of a country code, customer name, date of birth, and last four digits of a social security number such as SHA256 (USA*JOHN SMITH*19700101*1234). Hashing this value may result in a seemingly random string of characters, such as 754WD2E2513BF546050C2D079FF5D65AB6E318E and this can be an electronic identity. In some embodiments, the electronic identity is associated with a passphrase that is provided in order to access any interaction record associated with the electronic identity. An electronic identity may sometimes be referred to as an "eID," electronic identifier, or electronic identification data.

An "electronic record" may be any record of one or more transactions or interactions stored electronically. For example, an electronic record may comprise a number of interaction records associated with an electronic identity. In some embodiments, an electronic record may be compiled by identifying each of the interaction records recorded in a distributed environment that are associated with a particular electronic identity. In some embodiments, the electronic record may include a portion generated by, and signed using a private key associated with, the user with which the electronic identity is associated. In some embodiments, the electronic record may be in the form of or may be included a blockchain.

An "interaction record" can be any indication of a transaction or interaction that occurred between a user associated with an electronic identity and another entity. Examples of an interaction may include accessing a building, accessing a transportation area, accessing sensitive data, conducting a payment transaction, casting a vote, etc. An interaction record may include verifiable information relating to the interacting parties and the interaction that took place.

A "private key" is a type of cryptographic key that is kept secret by a party. Public and private keys may be used in a public-private encryption scheme or a digital signature scheme such as public key infrastructure (PKI).

A "public key" may be a type of cryptographic key that is distributed to, or available to, some entity over than a party holding a corresponding private key. In some embodiments, the key may be publically available, while in other cases it may be distributed to specific nodes of a network. A public key may be made available to either encrypt or verify information, depending on the cryptographic scheme.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing. In some examples of verification described in the disclosure, electronic records may be signed using a private key and verified using a public key.

A "verification network" may be any set of nodes (computer systems and components) configured to provide verification for a transaction. The verification network may comprise a distributed computing environment utilizing several nodes that are interconnected via communication links, using one or more computer networks or direct connections. The verification network may be implemented over any appropriate network, including an intranet, the Internet, a cellular network, a local area network or any other such network or combination thereof. In some embodiments, each of the nodes in a verification network may be computing devices belonging to a particular group or organization.

Details of some embodiments of the present invention will now be described.

Figure 1:
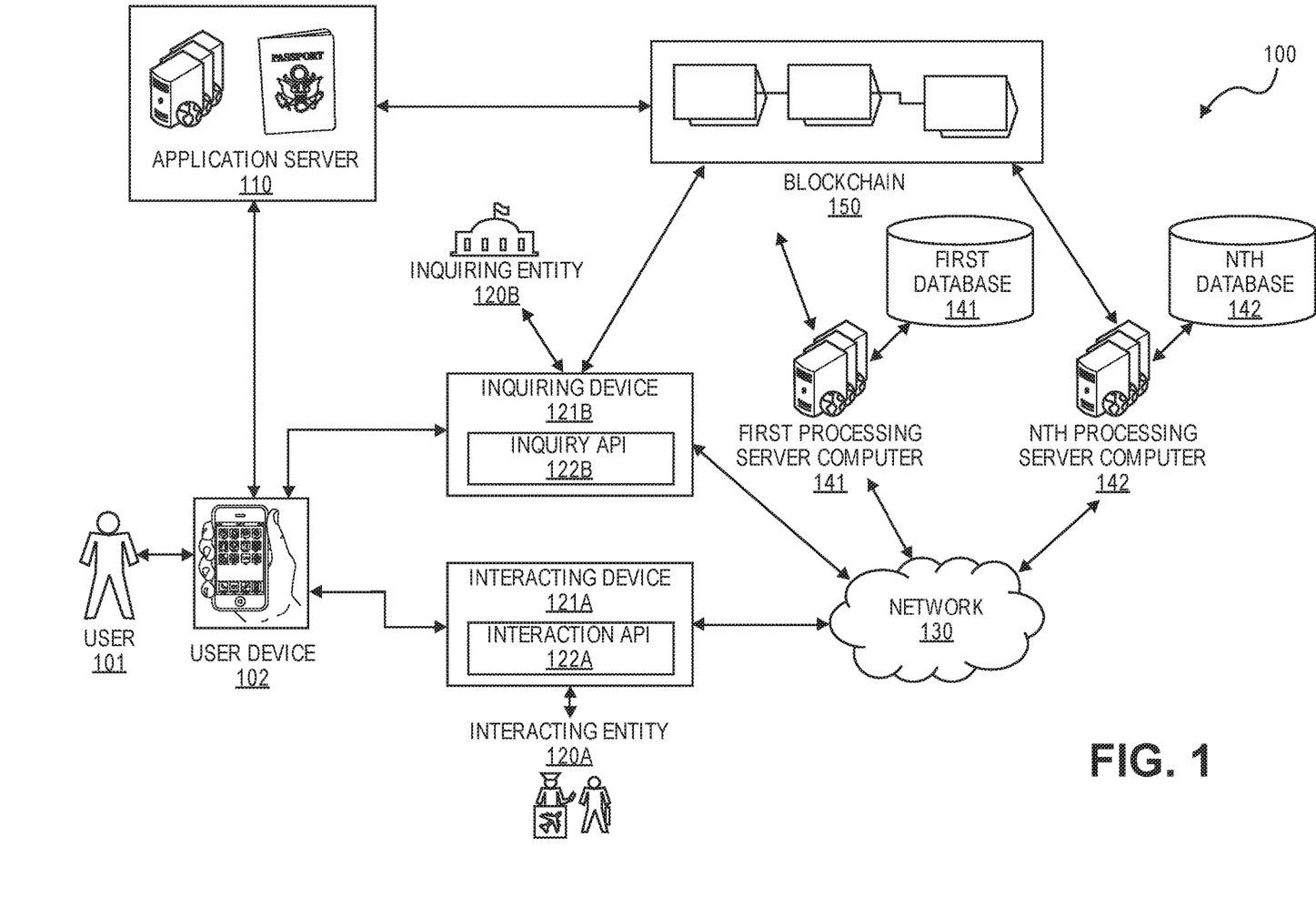
FIG. 1 shows a block diagram of a system for recording and verifying interactions according to embodiments of the invention.

FIG. 1 shows a block diagram of system 100 according to embodiments of the invention. System 100 may comprise user device 102, which may be used by user 101 to interact with the other devices of system 100. Interactions may occur through the use of an application stored on user device 102, which may be supported by application server 110. For example, the application may be an electronic passport application, digital wallet application, mobile banking application, electronic ticket application, or any other application that may be used to conduct interactions and/or log user activity.

System 100 may also comprise interacting device 121A for conducting interactions or transactions between user 101 and an interacting entity 120A. Examples of interacting device 121A may include POS terminals, personal computers, kiosks, mobile devices, or any other device capable of generating, transmitting, and receiving data to and from user device 102 during an interaction with user 101. Interacting device 121A may comprise interaction API 122A for performing tasks during an interaction such as generating, receiving, or transmitting interaction data according to embodiments of the invention. For example, interaction API 122A may be software that is provided to interacting entity 120A by a payment processing network or mobile application developer, so that interacting entity 120A may accept payments from user 101. Examples of interacting entity 120A may include merchants, government agencies, transportation providers, individual users, etc.

System 100 may also comprise inquiring device 121B, which may be a device used to inquire and/or verify records according to embodiments of the invention. Inquiring device 121B may comprise inquiry API 122B for performing tasks during verification of records such as the generation of inquiries or verification requests according to embodiments of the invention. Inquiry device 122B may be of an inquiring entity 120B, which may be any entity looking to verify a recorded interaction. Examples of inquiring entity 120B may include government agencies, banks, merchants, payment processors, landlords, etc.

According to embodiments of the invention, interacting device 121A and inquiring device 121B may communicate with one or more processing server computers via network 130, such as first processing server computer 141 and nth processing server computer 142. First processing server computer 141 may maintain one or more databases such as first database 141, and similarly, nth processing server computer 142 may maintain one or more databases such as nth database 142. According to one embodiment, the one or more processing server computers may be of a payment processing network such as VisaNet. System 100 may also comprise blockchain 150, which may be a publicly distributed database or ledger composed of blocks of encrypted data. Any number of devices of system 100 such as application server 110, user device 102, interacting device 122A, inquiring device 121B, first processing server computer 141, and/or nth processing server computer 142 may store at least a portion of blockchain 150. Each block in blockchain 150 may contain data relating to one or more interactions, a reference to a group of interactions, or hashes thereof. Each block in blockchain 150 may be unique, immutable, and verifiable between devices of system 100.

According to embodiments of the invention, user 101 may first register an account by establishing communications with application server 110 using user device 102. This may be done through an application stored on user device 102 that is provided and/or supported by application server 110. The application may be used to store data identifying user 101 onto user device 102. Data identifying user 101 may include information unique to the user such as name, address, phone number, social security number, email address, etc. and/or hashes thereof. The data identifying user 101 may be stored securely onto user device 102 through the use of hardware and/or software security modules, such as through the management of digital authentication keys and/or cryptoprocessing. The application may further comprise instructions for receiving and transmitting data relating to an interaction conducted between user 101 and interacting entity 120A, such as a timestamp, interaction location, interaction identifier, issuer identifier, account identifier, user ID, transaction ID, transaction amount, device ID, eID, merchant category code, and/or hashes thereof.

When conducting an interaction, user 101 may present user device 102 to interacting device 121A of interacting entity 120A. The interaction may be initiated by user 101 and/or interacting entity 120A, and interacting device 121A may generate a request for data from user 101. The request for data may be transmitted from interacting device 121A to user device 102. Communications between user device 102 and interacting device 121A may be accomplished through any number of data transfer means, such as through any contactless (e.g. Bluetooth, near-field communications, RFID, WiFi, etc.) or electrically contacted connection. For example, user device 102 may comprise an NFC chip, and interacting device 121A may be coupled to or include an NFC reader and may transmit and receive data to user device 102 when user device 102 is in close proximity to the reader. User device 102 may receive data requests from interacting device 121A by executing instructions stored in the application stored in user device 102. For example, user device 102 may be a mobile device running a passport application, and user 101 may be a passenger undergoing security screening at an airport. In this example, the interacting entity 120A may be a security agency, and may request that user 101 transmit his or her identification data from user device 102 to interacting device 121A in order to gain entrance into a terminal.

User device 102 may be configured to receive requests for data as well as configured to generate and transmit responses comprising the requested data. For example, user device 102 may be configured to receive a request for an electronic identity or eID identifying user 101 and may be further configured to transmit the eID to interacting device 121A in a data response message. In one embodiment, the transmission of requested data may be initiated by the presentation of authentication data by user 101, such as a biometric sample or password.

Interacting device 121A may be configured to receive requested data from user device 102, and may be further configured to transmit interaction data relating to an interaction, and/or hashes thereof, to a processing server computer such as first processing server computer 141 or nth processing server computer 142. In one embodiment, interactions may be generated as interaction records that are digitally signed by the involved interacting parties using a digital signature cryptography scheme. Interacting device 121A may generate, hash, and transmit the interaction data to the processing server computer, over network 130, by executing instructions provided by interaction API 122A. The processing server computer may receive the interaction data and/or hash of the interaction data and may store the interaction data in a database such as first database 141 or nth database 142. The processing server computer may then further determine an interaction identifier associated with the interaction data or hash of the interaction data, and may store and link the interaction identifier to the interaction data in the database. For example, the processing server computer may be a government server computer that may store a hash of a flight passenger's name, date of birth, address, flight details, and interaction timestamp. The hash may be linked, by the processing server computer, to an interaction identifier that may later be referenced at a later point in time.

First processing server computer 141 and/or nth processing server computer 142 may further be configured to determine a root hash of a hash tree. The hash tree may include the hash of first interaction data for a first interaction (i.e. an interaction conducted between user 101 and interacting entity 120A) as well as hashes of other interaction data for other interactions conducted by other users. In one embodiment, the other interaction data for other interactions conducted by other users may be data corresponding to interactions conducted at similar times and places as the first interaction. The interaction data or hashes of the interaction data may be received by the processing server computer and stored in a database such as first database 141 or nth database 142. The root hash may be a hash of the stored hashes that make up the hash tree, and may be provided by first processing server computer 141 or nth processing server computer 142 to a public blockchain so that the hash tree may be referenced at a later time. The root hash may be, for example, associated with a Merkle root that may be written into a header of a block published to blockchain 150. Blockchain 150 may then be updated, and the update may be broadcasted or transmitted to one or more nodes that each stores at least a portion of a copy of blockchain 150. For example, the update may be transmitted to application server 110, which may update its copy of blockchain 150 and may transmit the update to user device 102.

At a later point in time, inquiring entity 120B may wish to inquire or verify one or more interactions conducted by user 101. For example, inquiring entity 120B may be a government authority looking to verify the identity and travel activity of user 101. Inquiring entity 120B may ask or request user 101 to present proof of his or her identity, and may use inquiring device 121B to query, obtain, and verify records relating to interactions conducted by user 101. The interactions may be instances in which user 101 passed through a security checkpoint or passport control area, and hashes of the interaction data for the interaction may have been stored in a database such as first database 141 or nth database 142. The hashes may have further been hashed with other interactions conducted by other users into a root hash, which may have been published onto blockchain 150 by first processing server computer 141 or nth processing server computer 142.

According to embodiments of the invention, user 101 may use user device 102 to present and transmit identification data to inquiring device 121B. The requested data may be, for example, an electronic record of previous interactions, and may comprise interaction data, including first interaction data for a first interaction conducted between user 101 and interacting entity 121A or a hash thereof. Inquiring device 121B may be configured to receive the interaction data or hash of the interaction data, generate a verification request message comprising the interaction data or hash of the interaction data, and send the verification request to a processing server computer such as first processing server computer 141 or nth processing server computer 142. The processing server computer may receive the verification request message comprising the interaction data or hash of interaction data and may determine and/or identify a hash. For example, the processing server computer may read the data contained in the verification request message and may identify that the data corresponds to a hash '05901ALSKDJF12' linked to interaction ID '2142512.'

The processing server computer may then determine a hash tree using the hash and other hashes of other interaction data corresponding to other users. For example, the processing server computer may query a database for hashes of other hashes of other interaction data and compare the queried hashes to a mapping table that specifies the order in which the first hash and queried hashes were hashed together. The processing server computer may then retrieve the queried hashes and hash them according to the hashing order of the hash tree to determine a root hash. For example, the processing server computer may determine that the first hash and a second hash should be hashed together by concatenating the hashes and inputting them into SHA256( ) The processing server computer may further determine that the output from hashing the first hash and the second hash should be input into SHA256( ) along with a hash of a third hash and a fourth hash in order to output the root hash.

The root hash may then be compared to a corresponding root hash on blockchain 150. If there exists a block on blockchain 150 that comprises the determined root hash, the interaction data may be considered verified. Otherwise, if the root hash does not exist on blockchain 150, then the interaction data may be illegitimate, and therefore unverified. A verification result based on the comparison may be generated by the processing server computer and sent to inquiring device 121B.

According to an alternate embodiment, the processing server computer may be configured to send the determined root hash to inquiring device 121B, and inquiring device 121B may compare the received root hash to blockchain 150 or a portion of blockchain 150 to determine if a match exists, and therefore determine the verification result.

Figure 2:
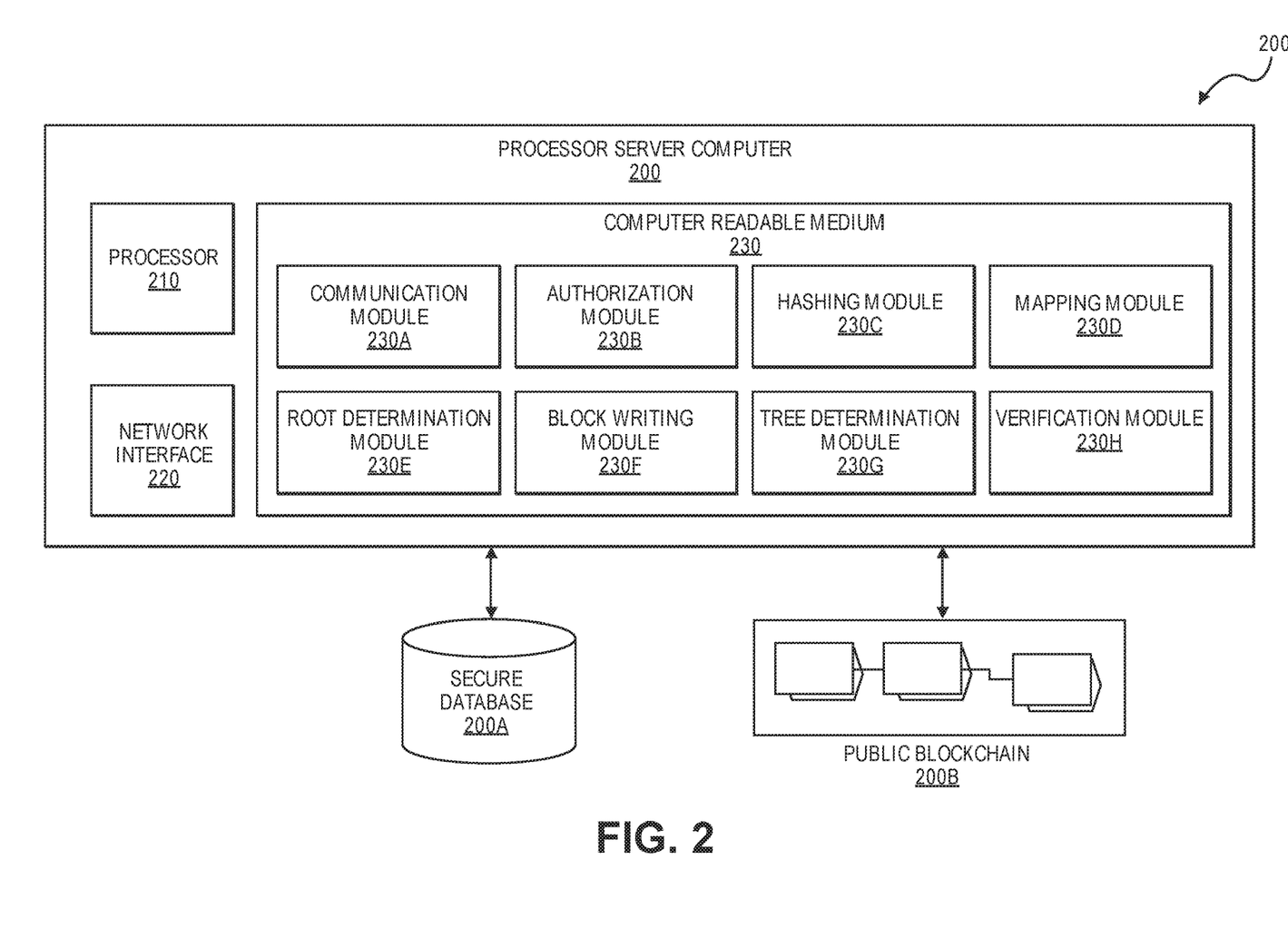
FIG. 2 shows a block diagram of a processing server computer according to embodiments of the invention.

FIG. 2 shows a block diagram of a processing server computer according to embodiments of the invention. Processing server computer 200 may be any processing server computer configured to process and verify interaction records such as first processing server computer 141 and nth processing server computer 142 of FIG. 1. Processing server computer 200 may comprise processor 210 for processing or executing instructions stored in computer-readable medium 230. Processing server computer 200 may also comprise one or more network interface 220, which may be a software and/or hardware interface that serves as a connection point between processing server computer 200 and the other nodes of a network, such as network 130 of FIG. 1.

Computer-readable medium 230 may be a non-transitory computer component that may be coupled to, and may store instructions executable by, processor 210. For example computer-readable medium 230 may be memory, such as random access memory (RAM) or read-only memory (ROM), which comprises code for implementing a method according to embodiments of the invention. Computer-readable medium 230 may comprise one or more modules, such as communication module 230A, authorization module 230B, hashing module 230C, mapping module 230D, root determination module 230E, block writing module 230F, tree determination module 230G, and verification module 230H. Processing server computer 200 may further be coupled to one or more databases such as secure database 200A and public blockchain 200B. Secure database 200A may be, for example, first database 141 or nth database 142 of FIG. 1, and may be configured such that only processing server computer 200 may read or update the stored data prior to the data being written to public blockchain 200B. Secure database 200A may be, for example, a relational database. Public blockchain 200B may be a publically distributed database such as blockchain 150 of FIG. 1, and may comprise immutable data that may be verified by nodes of a network.

According to embodiments of the invention, communication module 230A may comprise instructions for receiving, generating, formatting, and transmitting standardized messages over network interface 220. For example, communication module 230A may comprise instructions for receiving messages comprising interaction data, and may also comprise instructions for receiving verification request messages and for sending verification response messages relating to inquiries of recorded interactions.

Authorization module 230B may comprise instructions for authorizing an interaction based on a set of predetermined criteria. For example, authorization module 230 may comprise logic for accepting or declining a received interaction record by evaluating associated risks and/or comparing the interaction data to known characteristics of illegal activity.

Hashing module 230C may comprise instructions for hashing interaction data, or hashes of interaction data, using a hashing algorithm. For example, hashing module 230C may comprise instructions for inputting a first hash and a second hash into SHA256( ) to output an intermediate hash. Hashing module 230C may further comprise instructions for inputting the intermediate hash of the first hash and second hash, in addition to an intermediate hash of a third hash and a fourth hash into SHA256( ) to yield a root hash of a hash tree. The hash tree may be a tree of hashes, such as a Merkle tree, and may include the first, second, third, and fourth hashes stored in secure database 200A and intermediate hashes thereof.

Mapping module 230D may comprise instructions for determining an interaction identifier associated with received interaction data or a hash of interaction data. Mapping module 230D may further comprise instructions for determining an identifier for hashes of hashed interaction data, and linking their relation to each other in a mapping table or relational database. For example, mapping module 230D may comprise instructions for assigning an identifier to a first hash of first interaction data, and may further comprise instructions for assigning an identifier to an intermediate hash of the first hash and a second hash of second interaction data. Mapping module 230D may store the hashes of interaction data, and intermediate hashes thereof, in a column of a database table and may link each of the hashes to each of their assigned identifiers in another column of the database table. Mapping module 230D may further comprise instructions for determining how a given set of identifiers may be hashed together to form a given hash tree such as 'ID1+ID2=ID5; ID3+ID4=ID6; ID5+ID6=ID7.' According to one embodiment, the mapping table determined by mapping module 230D may be stored in a secure database such as secure database 200A.

Root determination module 230E may comprise executable instructions for instructing processing server computer 200 to determine a root hash of a given hash tree. For example, root determination module 230E may comprise instructions for determining a plurality of hashes of a mapping table, and hashing them together based on an order specified by mapping module 230D to yield a root hash. The root hash may later be associated with a Merkle root included in the header of a block in a public blockchain.

Block writing module 230F may comprise executable instructions for publishing data to a blockchain such as public blockchain 200B. For example, block writing module 230F may comprise instructions for providing a root hash of a hash tree to a public blockchain. The root hash may be provided to the blockchain by associating the root hash with a Merkle root included in the header of a newly generated block. The header of the new block may further comprise a hash of the previous block (i.e. Merkle root stored in the header of the previous block), and a transaction timestamp. Block writing module 230F may comprise instructions for generating a new block, determining the Merkle root of the previous or most recent block in the blockchain, and determining a timestamp based on the current time. Block writing module 230F may further comprise instructions for writing data into the header of the new block such as the timestamp, a root hash, and the Merkle root of the previous block as well as instructions for broadcasting the new block over a network.

Tree determination module 230G may comprise instructions for determining a hash tree using a received hash. For example, processing server computer 200 may receive a verification request message comprising interaction data or a hash of interaction data, and tree determination module 230G may comprise instructions for referencing a mapping table for a set of hashes of other interaction data and/or intermediate hashes of hashes of interaction data. Processing server computer 200 may further determine a hash tree using the received hash and the set of hashes of other interaction data and/or intermediate hashes of hashes of other interaction data, and may determine a root hash of the hash tree. According to one embodiment, tree determination module 230G may determine the root hash of the hash tree by concatenating hashes and inputting them into SHA256( ).

Verification module 230H may comprise instructions for comparing data to yield a verification result. For example, verification module 230H may comprise instructions for comparing a determined root hash of a determined hash tree to a corresponding root hash on a public blockchain such as public blockchain 200B. Verification module 230H may further comprise instructions for providing a verification result based upon the comparison, in which a first interaction between a user and an interaction entity is considered verified if the comparison yields a match. In one embodiment, verification module 230H may comprise instructions for providing the determined root hash to an inquiring device so that an inquiring entity may perform the comparison and determine a match. The verification result and/or root hash may be included in a verification response message.

Figure 3:
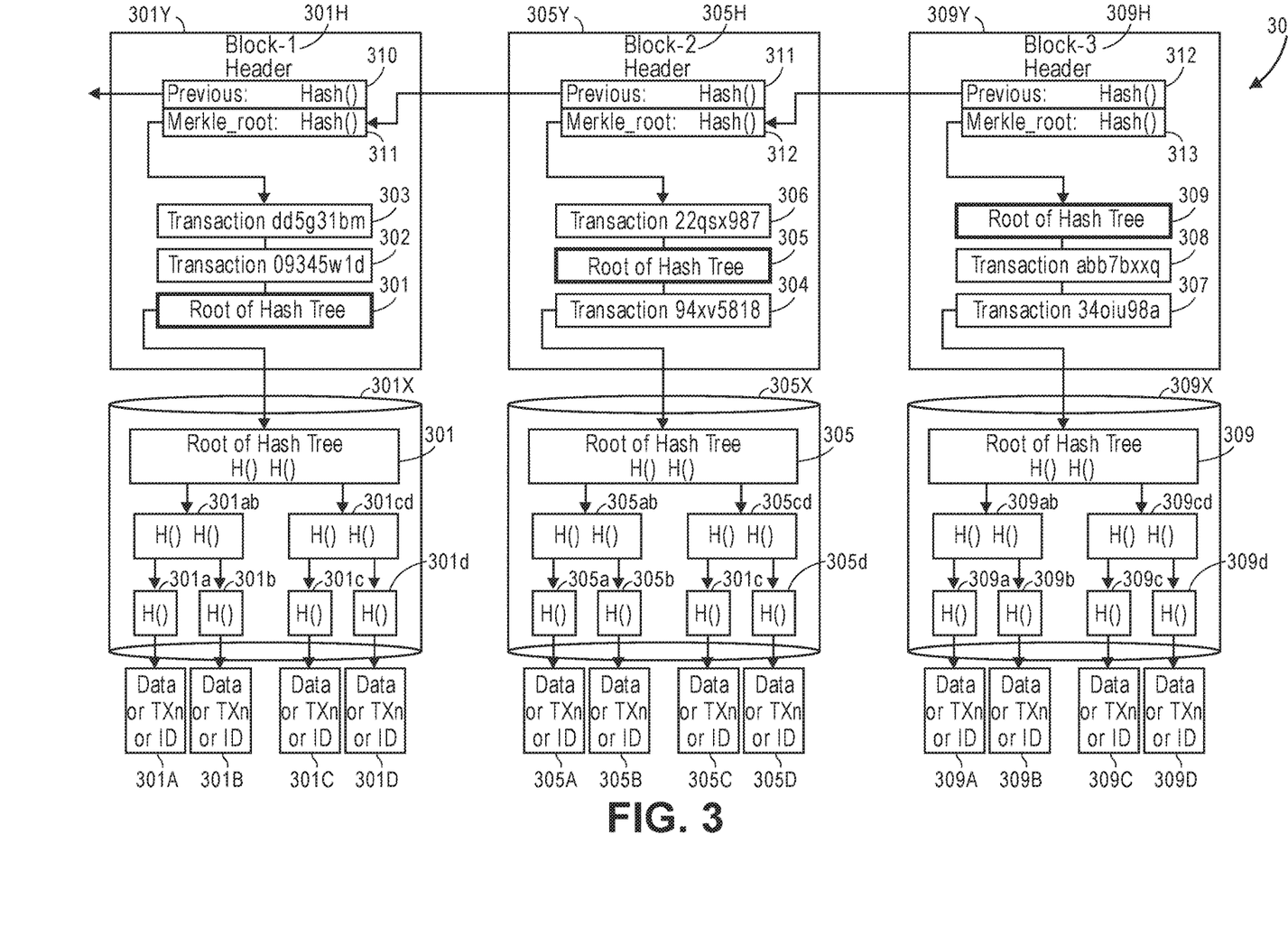
FIG. 3 shows a depiction of data storage according to an embodiment of the invention.

FIG. 3 shows a depiction of data storage according to an embodiment of the invention. FIG. 3 shows a plurality of interaction data for a plurality of interactions, such as interaction data 301A, 301B, 301C, 301D, 305A, 305B, 305C, 305D, 309A, 309B, 309C, and 309D. According to embodiments of the invention, each of the interaction data in the plurality of interaction data may be hashed and stored in a database. For example, an interacting device may conduct a first set of interactions with a first set of users, and may generate a hash of each of the corresponding interaction data, such as hash 301a, 301b, 301c, and 301d. The hashes may be transmitted, by the interacting device, to a first processing server computer and stored in a first database such as database 301X. The first processing server computer may further generate intermediate hashes from the stored hashes such as intermediate hash 301ab and intermediate hash 301cd. The first processing server computer may then concatenate and hash the intermediate hashes 301ab and 301cd to generate a root hash 301.

Once the root hash 301 has been generated, the first processing server computer may provide the root hash 301 to a block 301Y of a public blockchain. The block 301Y may include a block header 301H, which may comprise a link to the previous block 310 and a Merkle root 311. The Merkle root may comprise one or more reference hashes such as reference 303, reference 302, and root hash 301, which may each be hashes that reference one or more transactions or recorded interactions conducted or processed by other interacting entities or processing computers utilizing the public blockchain. The reference hashes may represent individual hashes of individual transactions, groups of transactions, or of any representative data relating to interactions conducted by one or more interacting entities. This may include root hashes published to the public blockchain as explained by the description contained herein or may also include any other hashed data published to the blockchain by some other means that may not be discussed here, but that may nonetheless represent publically verifiable data. According to one embodiment, reference 303, reference 302, and root hash 301 may be hashed together in a Merkle tree to yield Merkle root 311. Embodiments of the invention can allow the root of the hash tree 301 to be incorporated into a typical blockchain with hashes of individual transaction data, thus making embodiments of the invention adaptable and flexible.

The interacting device may conduct a second set of interactions with a second set of users, and may generate a hash of each of the corresponding interaction data, such as hash 305a, 305b, 305c, and 305d. The hashes may be transmitted, by the interacting device, to a second processing server computer and stored in a second database such as database 305X. The second processing server computer may further generate intermediate hashes from the stored hashes such as intermediate hash 305ab and intermediate hash 305cd. The second processing server computer may then concatenate and hash the intermediate hashes 305ab and 305cd to generate a root hash 305.

Once the root hash 305 has been generated, the second processing server computer may provide the root hash 305 to a block 305Y of a public blockchain. The block 305Y may include a block header 305H, which may comprise a link to the previous block 311. The link to the previous block 311 may be the Merkle root 311 included in the previous block's block header 301Y. The block header 305Y may further comprise a Merkle root 312. The Merkle root 312 of block 305Y may comprise one or more reference hashes such as reference 306, root hash 305, and reference 304. According to one embodiment, reference 306, root hash 305, and reference 304 may be hashed together in a Merkle tree to yield Merkle root 312.

The interacting device may conduct a third set of interactions with a third set of users, and may generate a hash of each of the corresponding interaction data such as hash 309a, 309b, 309c, and 309d. The hashes may be transmitted, by the interacting device, to a third processing server computer and stored in a third database such as database 309X. The third processing server computer may further generate intermediate hashes from the stored hashes such as intermediate hash 309ab and intermediate hash 309cd. The third processing server computer may then concatenate and hash the intermediate hashes 309ab and 309cd to generate a root hash 309.

Once the root hash 309 has been generated, the third processing server computer may provide the root hash 309 to a block 309Y of a public blockchain. The block 309Y may include a block header 409H, which may comprise a link to the previous block 312. The link to the previous block 312 may be the Merkle root 312 included in the previous block's block header 305Y. The block header 305Y may further comprise a Merkle root 313. The Merkle root 313 of block 309Y may comprise one or more reference hashes such as root hash 309, reference 308, and reference 307. According to one embodiment, root hash 309, reference 308, and reference 308 may be hashed together in a Merkle tree to yield Merkle root 313.

When an inquiring entity wishes to verify that an interaction occurred and is valid, the inquiring entity may use an inquiring device to generate a verification request message. The verification request may comprise interaction data corresponding to the interaction being subjected to inquiry or a hash thereof. In one embodiment, the interaction data or hash of the interaction data is received by the inquiring device from a user device of a user. The inquiring device may then send the verification request message comprising the interaction data or hash of the interaction data to a processing server computer such as processing server computer 200 of FIG. 2. The processing server computer may receive the verification request message and may determine and/or identify a hash from the data contained therein. For example, the processing server computer may receive the verification request message and may determine that the verification request message comprises hash 301*a*, which may be linked to a specific transaction ID or interaction identifier. In an alternate embodiment, the processing server computer may receive interaction data in the verification request message and may input the interaction data into SHA256( ) to determine hash 301*a*.

The processing server computer may then use hash 301*a* and the hashes of other interaction data to determine a hash tree. For example, the processing server computer may query a mapping table to determine a list of transaction IDs linked to other hashes of other interaction data for interactions of other users that are included in a hash tree comprising hash 301*a*. The processing server computer may determine that the hash tree comprising hash 301*a* also comprises hash 301*b*, hash 301*c*, hash 301*d* and intermediate hashes thereof. The processing server computer may then determine a root hash for the determined hash tree. For example, the processing server computer may concatenate hash 301*a* and hash 301*b* and input them into SHA256( ) to yield hash 301*ab*. The processing server computer may further concatenate hash 301*ab* and hash 301*cd* and input them into SHA256( ) to yield root hash 301.

The processing server computer may then determine a verification result by comparing the determined root hash to a corresponding root hash on the public blockchain. In one embodiment, the processing server computer may query or scan the public blockchain for a block comprising a header that includes a Merkle root associated with the determined root hash. For example, the processing server computer may scan the public blockchain and may determine that Merkle root 311 of block 301Y is associated with root hash 301. The processing server computer may then compare the data relating to the block to determine if the block comprises a root hash that matches the determined root hash. For example, the processing server computer may compare each character of the determined root hash 301 to each of the characters in each of the reference hashes 303, 302, 301 to determine a match. According to one embodiment, the processing server computer may also determine if other data in the block matches expected results, such as the link to the previous block. It may be appreciated that additional validation checks may also be performed such as check sum validations and digital signature validations.

If the determined root hash matches a corresponding root hash on the public blockchain, a verification result of "verified" may be generated. Otherwise, a verification result of "no match" or "invalid data" may be generated. The processing server computer may generate a verification response message comprising the verification result and may send the verification response message to the inquiring device, so that the inquiring entity may take appropriate action. According to one embodiment, the verification result may comprise the determined root hash, and the inquiring device may receive the determined root hash and compare it to the public blockchain to determine a verification result.

Figure 4:
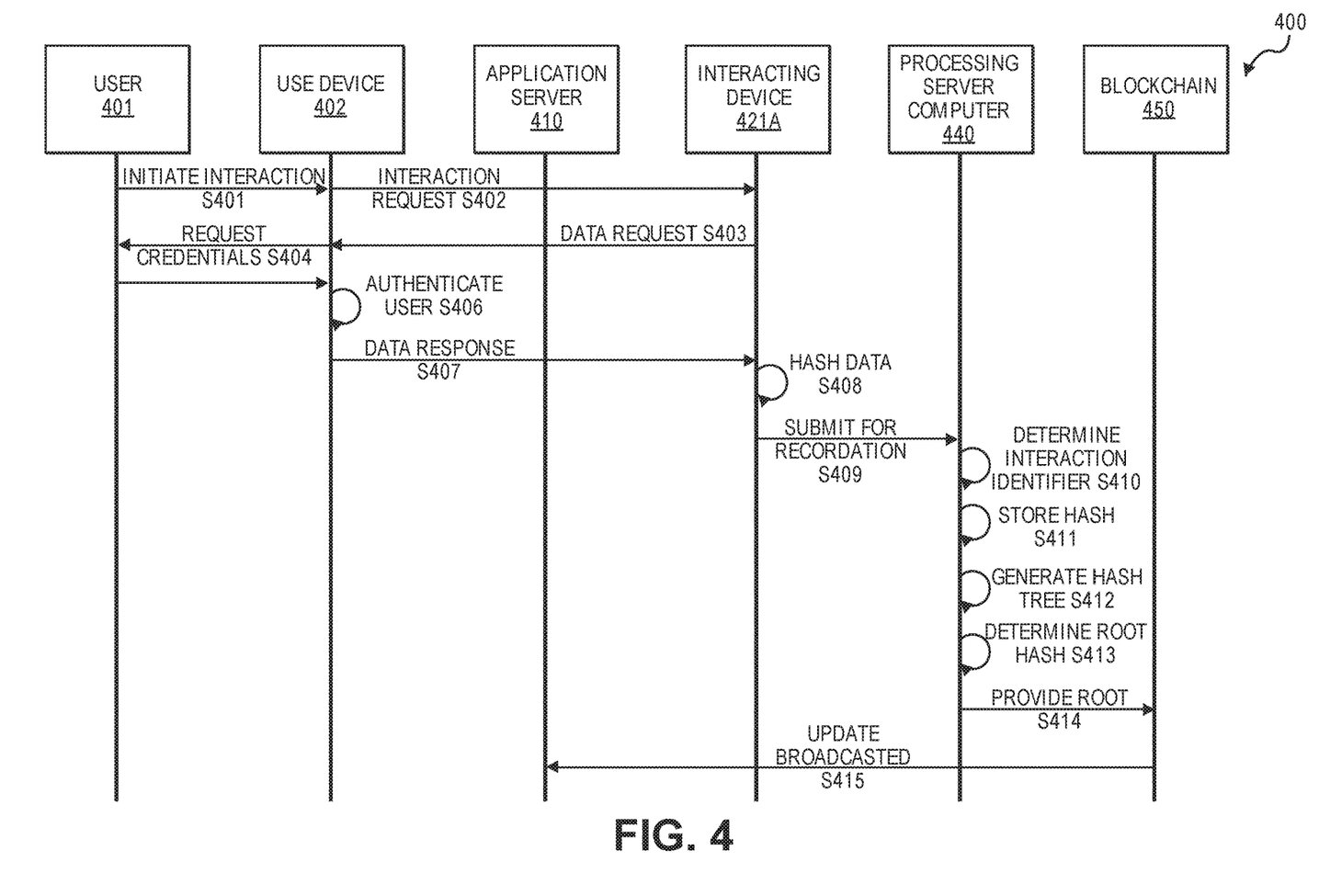
FIG. 4 shows a swim-lane diagram of recording an interaction according to an embodiment of the invention.

FIG. 4 shows a swim-lane diagram of recording an interaction according to an embodiment of the invention. Specifically, FIG. 4 depicts the transfer and storage of data between a user 401, a user device 402, an application server 410, an interacting device 421A, a processing server computer 440, and a blockchain 450. The user 401, user device 402, application server 410, interacting device 421A, processing server computer 440, and block 450 may correspond to user 101, user device 102, application server 110, interacting device 121A, first processing server computer 141 or nth processing server computer 142, and blockchain 150 of FIG. 1 respectively.

According to FIG. 4, the user 401 initiates a first interaction by providing or communicating information to his or her user device 402 in S401. For example, the user device 402 may be a mobile device, and user 401 may open an application stored on the device to input information relating to the interaction into provided data fields. For example, the application may be a mobile voting application that provides data fields in the form of a ballot that is displayed to the user and allows the user to enter or select the name of the candidate they wish to vote for. The user device 402 may receive the information communicated by the user 401 and may generate data from the received information.

In step S402, the user device 402 may determine, from the information provided by the user 401, that the user S401 intends to initiate an interaction, and may generate and transmit an interaction request message to the interacting device 421A. For example, the user 401 may determine that a vote selection has been made by the user 401, and may then generate and transmit an interaction request message to the interacting device 421A so that the user's vote may be cast or recorded.

The interacting device 421A may receive the interaction request message and may request interaction data from user device 402 by sending a data request message in S403. For example, the interacting device 421A may be a voting machine that may receive a request to cast a vote and may in turn send a request for necessary interaction data such as voter identification and vote selection.

In S404, the user device 402 may receive the data request message and may request credentials from user 401 for authentication. For example, the user device 402 may prompt the user 401 to provide his or her biometric so that identification data needed for the interaction may be accessed. In S405, the user 401 may then provide his or her credentials to user device 402. For example, the user 401 may present his or her biometric sample to a biometric reader of the user device 402 (e.g. fingerprint reader, front facing camera, etc.). In S406, the user device 402 may receive the credentials of user 401 and may authenticate him or her based on their validity. For example, the user device 402 may generate a biometric sample template from the biometric sample presented by the user 401 and may compare the biometric sample template to a stored biometric reference template to determine a match (e.g. using facial recognition, voice recognition software, etc.). If the templates match within a predetermined threshold, then the credentials may be considered valid and the user 401 authenticated.

In S407, upon authentication of the user 401, the user device 402 may generate and transmit a data response message comprising the requested interaction data to the interacting device 421A. For example, the user device 402 may generate a data response message comprising user 401's name, address, identification number, and vote selections, and may transmit the data response message to the interacting device 421A. In one embodiment, the interacting device may comprise logic to initiate an action based on the received interaction data. For example, the interacting device 421A may comprise logic for verifying user data and/or logic for increasing the value of a counter such as a vote count for a particular candidate. In other examples, the interacting device 421A may comprise logic for granting access to an entry point, opening a door, providing a resource such as food or consumer goods, providing a service, etc.

In S408, the interacting device 421A may receive the data response message and may generate a hash of the interaction data contained therein. In one embodiment, the interacting device 421A may comprise an API or software that may receive interaction data included in a data response message and may input the interaction data into a hashing algorithm such as SHA256( ) For example, the interacting device 421A may hash a user's name, address, identification number, and vote selection by concatenating and inputting them into a hashing algorithm such as SHA256('John Smith', '5703 Bishops Glen Ct. Houston, Tex. 77084', '893-34-3243', 'Candidate A') to yield, '90172AKLSD3JG9023U59S135.'

In S409, the interacting device 421A may submit the hash of the interaction data to a processing server computer 440 for recordation.

The processing server computer 440 may receive the hash of the interaction data and may determine an interaction identifier for the interaction in S410. The processing server computer 440 may then link the determined interaction identifier to the hash of the interaction data. In one embodiment, the processing server computer 440 may also generate a timestamp based on the current time and may link the timestamp to the hash of the interaction data. For example, the processing server computer 440 may link, in a relational database, an interaction identifier of 'Vote: 32352' and a timestamp of '2020-11-03T03:30:38Z' to hash '90172AKLSD3JG9023U59S135.'

In S411, the processing server computer 440 may store the hash in a secure database. After a number of other interactions have been conducted at interacting device 421A and stored by the processing server computer 440, the processing server computer 440 may generate a hash tree including the hash of the interaction data for the first interaction and hashes of interaction data for the other interactions in S412. The processing server computer 440 may then determine a root hash for the hash tree in S413. In S414, the processing server computer 440 may then provide the root hash to blockchain 450 so that the interactions included in the hash tree may later be verified. In S415, the root hash may be published onto blockchain 450 and the updated blockchain may be broadcasted to the nodes of the blockchain network including application server 410.

Figure 5:
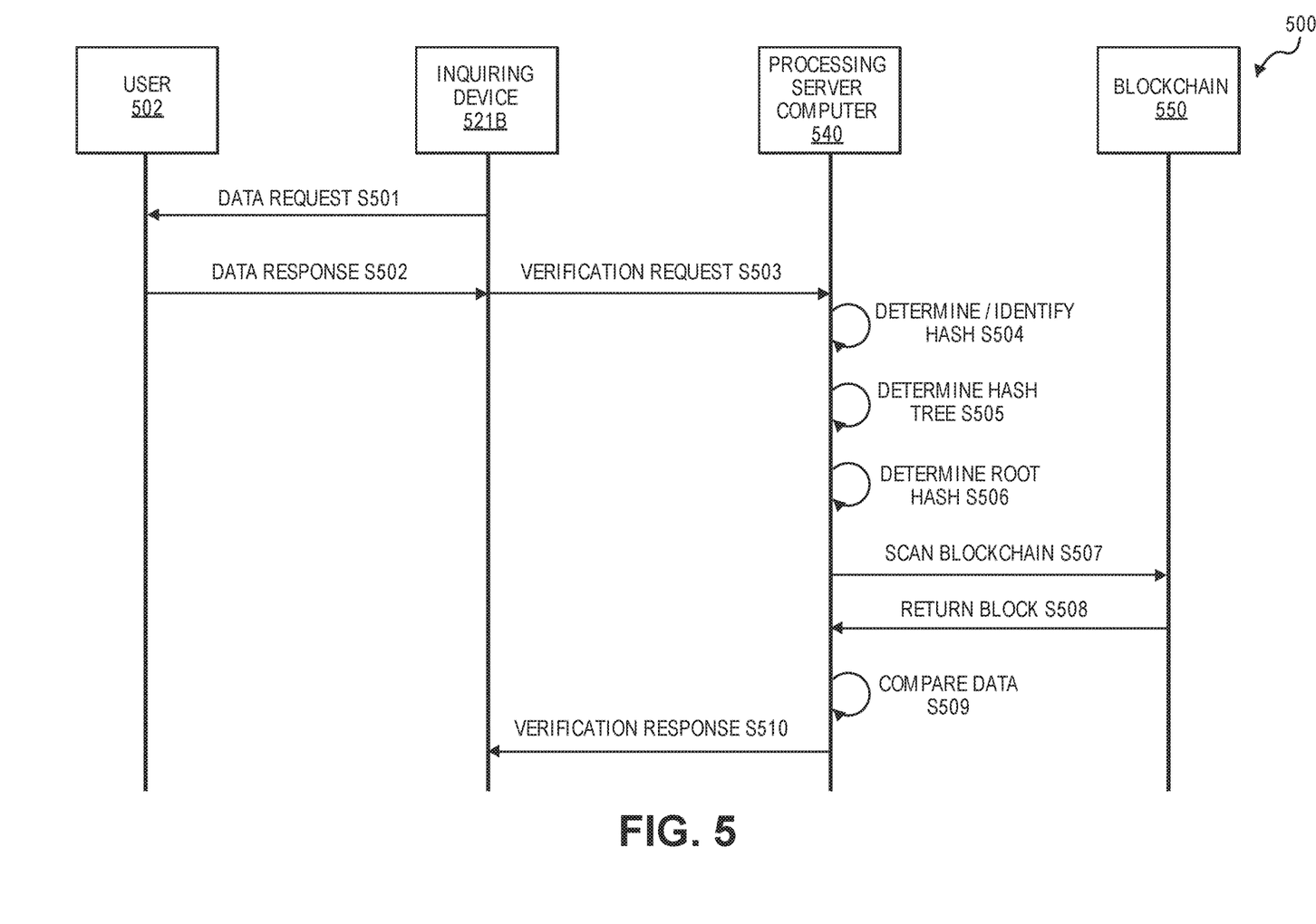
FIG. 5 shows a swim-lane diagram of verifying an interaction according to an embodiment of the invention.

FIG. 5 shows a swim-lane diagram of verification according to an embodiment of the invention. According to FIG. 5, verification may be performed between a user device 502, an inquiring device 521B, a processing server computer 540, and a public blockchain 550, which may correspond to user device 102, inquiring device 121B, first processing server computer 141 or nth processing server computer 142, and blockchain 150 of FIG. 1 respectively.

According to FIG. 5, an inquiring device 521B may send a data request message requesting interaction data to be verified in S501. For example, an inquiring device 521B used to verify the proper recordation of votes may request from user device 502 interaction data relating to a particular vote that was cast. In S502, the user device may receive the data request message and may generate and transmit a data response message comprising the interaction data or hash of the interaction data to the inquiring device 521B. For example, the data response message may comprise a string of characters, '90172AKLSD3JG9023U59S135,' which may be a hash of a user's name, address, identification number, and vote selection, SHA256('John Smith', '5703 Bishops Glen Ct. Houston, Tex. 77084', '893-34-3243', 'Candidate A'). The inquiring device 521B may receive the data response message, and may generate a verification request message comprising the hash of the interaction data. The inquiring device 521B may send the verification request message to a processing server computer 540 in S503.

In S504, the processing server computer 540 may receive the verification request message and may determine or identify the hash contained therein. In one embodiment, the processing server computer 540 may query a database for an interaction identifier linked to the received hash. For example, the processing server computer 540 may receive in the verification request message, hash '90172AKLSD3JG9023U59S135,' and may query a relational database to determine that the hash is linked to an interaction identifier of 'Vote: 32352.'

In S505, the processing server computer 540 may determine a hash tree using the identified hash and other hashes of other interaction data for other interactions made by other users. For example, the processing server compute 540 may query a database, and may determine that interaction identifier 'Vote: 32352' is included in a hash tree that also includes 'Vote: 12425,' 'Vote: 24242,' and 'Vote: 30023.' In S506, the processing server computer 540 may determine a root hash by hashing together the received hash of inquired interaction data with other hashes in the determined hash tree. In one embodiment, the root hash for the hash tree may be determined by referencing a mapping table. For example, the processing server computer 540 may reference a table and determine the root hash by inputting the hashes into a hashing algorithm according to the following order: 'Vote: 12425+Vote: 24242=k29350; Vote: 32352+Vote: 30023=125jp3; k29350+125jp3=root hash=102JKJ1293.'

In S507, the processing server computer 540 may query or scan a public blockchain 550 to compare the determined root hash to a corresponding root hash on the blockchain 550. In S508, the processing server computer 540 may determine a block on the blockchain that comprises the determined root hash. In S509, the processing server computer 540 may compare data in the determined block to expected data to determine a verification result. For example, the processing server computer 540 may determine that the Merkle root and timestamp included in the block's header matches expected values and may determine a verification result of 'Verified.' In S510, the processing server computer 540 may generate and send a verification response message comprising the verification result to the inquiring device 521B. The inquiring device 521 may receive the verification response message comprising the verification result to take appropriate action. For example, the inquiring device 521 may receive the verification response message and may display the verification result on a display of the inquiring device 521. According to one embodiment, the verification response message may comprise the determined root hash, and the inquiring device may compare the root hash to the blockchain 550 for verification.

Embodiments of the invention provide a number of technical advantages over prior art, in that they provide a method of information or data recordation that is secure and efficient. Specifically, according to embodiments of the invention, data is decentralized, and may be publically verified while being privately stored on a user device. Embodiments of the invention also allow users to easily present records to a third party or inquiring entity, and in a manner that does not require reproduction of documents or require users to establish trust with a central authority. In addition, data recordation methods taught by embodiments of the invention provide greater security over centralized methods, in that they are less vulnerable to injection attacks or the exposure or utilization of data in an unwanted manner. Furthermore, by locally storing and hashing together a plurality of hashes of interaction data into a root hash of a hash tree prior to recordation onto the blockchain, interactions may be processed more quickly than previous blockchain methods that publish to a block during each individual interaction. This may be of use in retail environments or any environment in which several interactions are expected to occur within a relatively small period of time, such as thousands of transactions or interactions per second.

It should also be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising steps including:

receiving, by a computer comprising a mapping module including a mapping table, first interaction data for a first interaction between a user and an interacting entity, or a first hash of the first interaction data;

determining, by the computer, a first interaction identifier associated with the first interaction data or the first hash of the first interaction data;

storing, by the computer, the first hash of the first interaction data in a database along with the first interaction identifier;

determining, by the computer, a first root hash of a first hash tree, the first hash tree including the first hash of the first interaction data and hashes of other interaction data of other interactions by other users, and intermediate hashes based on the first hash and the hashes of the other interaction data;

storing and linking the first interaction identifier and the first hash associated with the first interaction data and other interaction identifiers and the hashes of the other interaction data in the mapping table, the mapping table further comprising a first column with hashes including the first hash and the hashes of the other interaction data, and a second column with interaction identifiers including the first interaction identifier and the other interaction identifiers, the hashes in the first column respectively linked to interaction identifiers in the second column, and instructions for determining how hashes associated with the first interaction identifier and the other interaction identifiers are hashed together in the formation of the first hash tree;

providing, by the computer, the first root hash of the first hash tree to a public blockchain;

receiving, by the computer, a request to verify the first interaction between the user and the interacting entity from an inquiring entity device, the request comprising the first interaction data or the first hash;

determining, by the computer, the first hash based on the request to verify the first interaction;

determining, by the computer, the first interaction identifier of the first hash;

determining, by the computer and using the mapping table, the other interaction identifiers of the hashes of the other interaction data using the interaction identifier of the first hash;

determining, by the computer, the hashes associated with the other interaction identifiers;

forming, by the computer, a second root hash according to the instructions in the mapping table by at least hashing the first hash, and the hashes of the other interaction data for the other interactions by the other users to form intermediate hashes, and then hashing at least the intermediate hashes;

comparing, by the computer, the second root hash to the first root hash on the public blockchain; and responsive to comparing, providing, by the computer, a verification result indicating that the first interaction between the user and the interacting entity occurred.

2. The method of claim 1, wherein the request to verify includes the first interaction data.

3. The method of claim 1, wherein the request to verify includes the first hash of the first interaction data.

4. The method of claim 1, wherein the steps are performed in order.

5. The method of claim 1, wherein determining the first root hash comprises inputting the first hash and the hashes of the other interaction data for the other interactions by the other users into a hashing algorithm according to an order specified by the mapping table.

6. A server computer comprising:
a network interface;
a processor; and
a non-transitory computer-readable medium comprising a mapping table and code for instructing the processor to implement a method, the method comprising:
receiving first interaction data for a first interaction between a user and an interaction entity, or a first hash of the first interaction data;
determining a first interaction identifier associated with the first interaction data or the first hash of the first interaction data;
storing the first hash of the first interaction data in a database along with the first interaction identifier;
determining a first root hash of a first hash tree, the first hash tree including the first hash of the first interaction data and hashes of other interaction data by other users, and intermediate hashes based on the first hash and the hashes of the other interaction data;
storing and linking the first interaction identifier and the first hash associated with the first interaction data, and other interaction identifiers of the hashes of the other interaction data in the mapping table, the mapping table further comprising a first column with hashes including the first hash and the hashes of the other interaction data, and a second column with interaction identifiers including the first interaction identifier and the other interaction identifiers, the hashes in the first column respectively linked to interaction identifiers in the second column, and instructions for determining how hashes associated with the first interaction identifier and the other interaction identifiers are hashed together in the formation of the first hash tree;
providing the first root hash of the first hash tree to a public blockchain;
receiving a request to verify the first interaction between the user and the interacting entity from an inquiring entity device, the request comprising the first interaction data or the first hash;
determining the first hash based the request to verify the first interaction;
determining the first interaction identifier of the first hash;
determining, using the mapping table, the other interaction identifiers of the hashes of the other interaction data using the first interaction identifier of the first hash;
determining the hashes associated with the other interaction identifiers;
forming a second root hash according to the instructions in the mapping table by at least hashing the first hash, and the hashes of the other interaction data for the other interactions by the other users to form the intermediate hashes, and then hashing at least the intermediate hashes;
comparing the second root hash to the first root hash on the public blockchain; and
responsive to comparing, providing a verification result indicating that the first interaction between the user and the interacting entity occurred.

7. The server computer of claim 6, wherein the request to verify includes the first interaction data.

8. The server computer of claim 6, wherein the request to verify includes the first hash of the first interaction data.

9. The server computer of claim 6, wherein determining the first root hash comprises inputting the first hash and the hashes of the other interaction data for the other interactions by the other users into a hashing algorithm according to an order specified by the mapping table.

10. The method of claim 1, wherein the first interaction identifier and the other interaction identifiers are transaction identifiers.

11. The method of claim 1, wherein the inquiring entity device is operated by a governmental agency or a merchant.

12. The method of claim 1, wherein the computer is a processing server computer.

13. The method of claim 1 wherein the first interaction identifier and the other transaction identifiers are transaction IDs.

14. The method of claim 1, wherein the first interaction is a payment transaction.

15. The method of claim 1, wherein the interacting entity is a merchant.

16. The server computer of claim 6, wherein the first interaction identifier is a transaction ID.

17. The server computer of claim 16, wherein the first interaction is a payment transaction.

18. The server computer of claim 17, wherein the interacting entity is a merchant.

* * * * *